(12) United States Patent
Naito

(10) Patent No.: US 11,180,321 B2
(45) Date of Patent: Nov. 23, 2021

(54) CONVEYOR

(71) Applicant: TOSHIBA TEC KABUSHIKI KAISHA, Tokyo (JP)

(72) Inventor: Hidehiro Naito, Mishima Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/922,996

(22) Filed: Jul. 7, 2020

(65) Prior Publication Data
US 2021/0078805 A1 Mar. 18, 2021

(30) Foreign Application Priority Data
Sep. 18, 2019 (JP) .............................. JP2019-169376

(51) Int. Cl.
*B65G 23/04* (2006.01)
*B65G 47/57* (2006.01)
*B65G 15/24* (2006.01)

(52) U.S. Cl.
CPC ............ *B65G 15/24* (2013.01); *B65G 23/04* (2013.01); *B65G 47/57* (2013.01); *B65G 2203/0216* (2013.01); *B65G 2203/04* (2013.01); *B65G 2203/041* (2013.01)

(58) Field of Classification Search
None
See application file for complete search history.

(56) References Cited

U.S. PATENT DOCUMENTS

| | | | |
|---|---|---|---|
| 5,203,124 A * | 4/1993 | Carpenter ............... | B24C 9/006 451/75 |
| 8,201,681 B2 * | 6/2012 | Schiesser ............... | B65G 43/08 198/460.1 |
| 8,459,558 B2 * | 6/2013 | Baitz .................. | G06K 7/10871 235/470 |
| 8,714,342 B2 * | 5/2014 | Halloran ........... | H01L 21/67276 198/460.1 |
| 8,997,972 B2 | 4/2015 | Ryabinin et al. | |
| 10,647,520 B2 * | 5/2020 | Hartmann ............. | B65G 43/08 |
| 10,875,724 B2 * | 12/2020 | Aschpurwis ........... | B65G 43/08 |
| 2004/0199427 A1 * | 10/2004 | van der Loo ...... | G01G 19/4144 705/16 |
| 2012/0187195 A1 | 7/2012 | Actis et al. | |
| 2014/0048388 A1 * | 2/2014 | Hefner .................. | B65G 15/24 198/606 |

OTHER PUBLICATIONS

Extended European Search Report dated Feb. 8, 2021 in corresponding European Patent Application No. 20191496.7, 10 pages.

* cited by examiner

Primary Examiner — Kavel Singh
(74) Attorney, Agent, or Firm — Kim & Stewart LLP

(57) ABSTRACT

A conveyor includes a first conveyor belt with a first surface along which an article is conveyed in a conveyance direction from an upstream end to a downstream end, The first surface has an upstream end and a downstream end along the conveyance direction. A second conveyor belt is directly downstream of the first conveyor belt in the conveyance direction and has a second surface along which the article is conveyed in the conveyance direction from an upstream end to a downstream end. The downstream end of the first surface is at a height greater than the upstream end of the second surface. A first reading unit is positioned to read a symbol on the article through a gap left between the first and second conveyor belts.

13 Claims, 4 Drawing Sheets

CONVEYOR

CROSS-REFERENCE TO RELATED APPLICATION(S)

This application is based upon and claims the benefit of priority from Japanese Patent Application No. 2019-169376, filed on Sep. 18, 2019, the entire contents of which are incorporated herein by reference.

FIELD

Embodiments described herein relate generally to a conveyor.

BACKGROUND

In recent years, symbols, such as barcodes and two dimensional codes, have been used for identifying articles or containers for the articles. For example, in a case where articles are carried out from or to a factory or a warehouse, or articles purchased in a store are shipped to customers, such symbols that identify the articles are printed on labels and attached to the articles or the containers. When the articles are shipped, they are conveyed by a conveyor, and the symbols attached to the articles are optically read by a reader such as a camera.

Conventionally, in order to make sure that a symbol attached to an article is read, several symbol reading devices are arranged around the conveyor, e.g., on an upper side, a lower side, a right side, and a left side of the article being conveyed by the conveyor.

In particular, in order to read symbols facing downward, it is known to use two conveyors arranged in a conveyance direction of articles and having a gap therebetween so that a symbol reading device can read the symbols through the gap from below.

However, when the article is small, the article is stuck in the gap, and the conveyance may be hindered.

DETAILED DESCRIPTION

According to one embodiment, a conveyor includes a first conveyor belt having a first surface along which an article can be conveyed in a conveyance direction from an upstream end to a downstream end. The first surface has an upstream end and a downstream end along the conveyance direction. A second conveyor belt is directly downstream of the first conveyor belt in the conveyance direction and has a second surface along which the article can be conveyed in the conveyance direction from an upstream end to a downstream end. The downstream end of the first surface is at a height greater than the upstream end of the second surface. A first reading unit is positioned to read a symbol of the article through a gap left between the first and second conveyor belts.

Hereinafter, embodiments of a conveyor will be described with reference to drawings. In the embodiments, a belt conveyor will be described as an example of a conveyor.

First Embodiment

Figure 1:
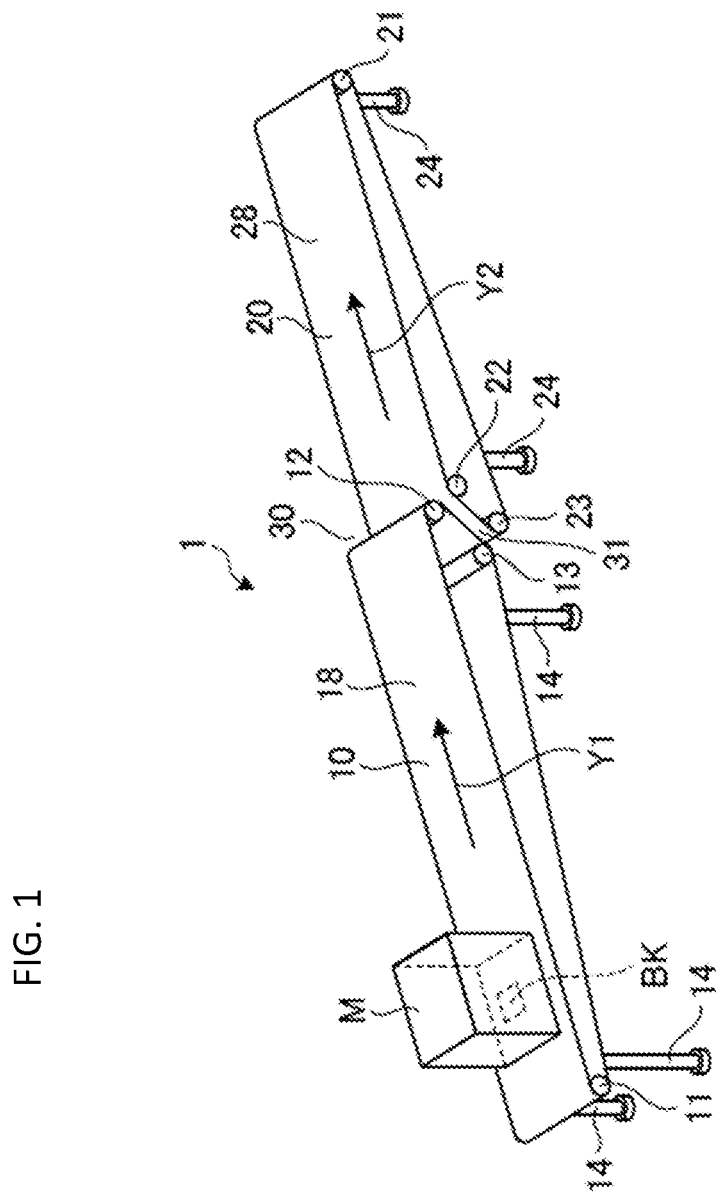
FIG. 1 is a perspective view illustrating a belt conveyor according to a first embodiment.

First, a configuration of a belt conveyor 1 according to a first embodiment will be described. The belt conveyor is used, for example, in transporting articles from a warehouse or in loading them into a warehouse. FIG. 1 is a perspective view illustrating the belt conveyor 1 according to the first embodiment.

The belt conveyor 1 comprises a first belt conveyor 10 and a second belt conveyor 20. The first belt conveyor 10 is a belt conveyor having a flat conveyance surface on which an operator places an article M. The article M refers to an article itself or a container such as a box in which an article is stored. A symbol BK, such as a barcode or a two-dimensional code, including information indicating the article M is attached to one surface or two or more surfaces of the article M. The symbol BK is printed directly on the article M or printed on a label attached to the article M.

The first belt conveyor 10 includes a roller 11, a roller 12, and a roller 13 that can rotate. One or more of the roller 11, the roller 12, and the roller 13 are rotated by a power source (not shown). Further, the first belt conveyor 10 comprises a first conveyor belt 18 formed of endless rubber, cloth, caterpillar, or the like. The first conveyor belt 18 is stretched around the roller 11, the roller 12, and the roller 13. The first conveyor belt 18 are rotated by the rotating rollers 11-13, and conveys the article M placed on the conveyance surface of the first conveyor belt 18 in the Y1 direction. Further, the first belt conveyor 10 comprises four or more leg members 14. The leg members 14 support the conveyance surface of the first conveyor belt 18 horizontally in an upward position from the floor surface.

The second belt conveyor 20 is a belt conveyor having a flat conveyance surface carrying the article M that has been conveyed from the first belt conveyor 10 or the first conveyor belt 18. The second belt conveyor 20 includes a roller 21, a roller 22, and a roller 23 that can rotate. One or more of the roller 21, the roller 22, and the roller 23 are rotated by a power source (not shown). Further, the second belt conveyor 20 includes a second conveyor belt 28 formed of an endless rubber, a cloth, a caterpillar, or the like. The second conveyor belt 28 is stretched around the roller 21, the roller 22, and the roller 23. The second conveyor belt 28 are rotated by the rotating rollers 21-23, and conveys the article M placed on a conveyance surface of the second conveyor belt 28 in the Y2 direction. Further, the second belt conveyor 20 comprises four or more leg members 24. The leg members 24 support the conveyance surface of second conveyor belt 28 horizontally in an upward position from the floor surface.

The first conveyor belt 18 and the second conveyor belt are located close to each other along the conveyance direction of the article M. Further, the first conveyor belt 18 and the second conveyor belt 28 are maintained in a non-contact state with each other. Further, the first conveyor belt 18 and the second conveyor belt 28 are arranged in a substantially linear shape. The structure in a proximity region 30 formed near an end of each of the first conveyor belt 18 and the second conveyor belt 28 will be described later with reference to FIG. 3. The belt conveyor 1 includes a reading unit L illustrated in FIG. 2 near the proximity region 30. However, in FIG. 1, the reading unit L is omitted in order to illustrate aspects of the proximity region 30.

Figure 2:
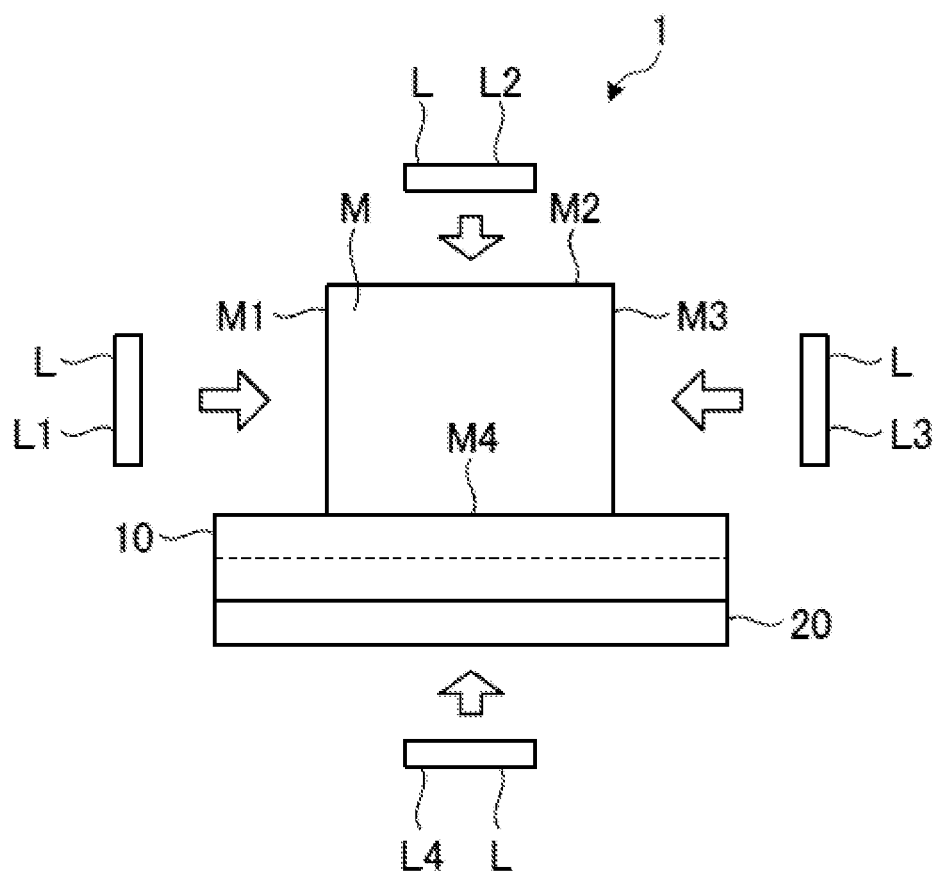
FIG. 2 is a diagram illustrating an arrangement of a reading unit surrounding a belt conveyor.

Hereafter, an arrangement of the first belt conveyor 10 and the second belt conveyor 20 and the reading unit L in the belt conveyor 1 will now be described. FIG. 2 is a diagram illustrating the arrangement of the first belt conveyor 10, the second belt conveyor 20, and the reading unit L when the belt conveyor 1 is viewed from an upstream side in the conveyance direction of the article M. As shown in FIG. 2, in the belt conveyor 1, in the vicinity of the proximity region 30, the reading unit L is arranged so as to surround the first belt conveyor 10 and the second belt conveyor 20.

The reading unit L includes four code readers, namely a code reader L1, a code reader L2, a code reader L3, and a code reader L4. The code readers L1 to L4 are scanners that optically read the symbol BK attached to the article M, for example. Alternatively, the code readers L1 to L4 are cameras that capture and read the symbol BK attached to the article M. The symbol BK indicates information of the article M to which the symbol BK is attached. The code reader L1 is located in a position facing the one side surface of the article M to be conveyed, the one side being orthogonal to the conveyance direction. The code reader L1 reads the symbol BK attached to one side surface (surface M1) from the side. The code reader L2 is located in a position facing an upper surface of the article M to be conveyed. The code reader L2 reads the symbol BK attached to the upper surface (the surface M2) from above. The code reader L3 is located in a position facing the other side surface on the side opposite to the side surface of the article M to be conveyed, the other side being orthogonal to the conveyance direction. The code reader L3 reads the symbol BK attached to the other side surface (the surface M3) from the side. The code reader L4 is located in a position facing the lower surface (surface in contact with the conveyance surface) of the article M to be conveyed. The code reader L4 reads the symbol BK attached to the lower surface M4 from the lower side.

Figure 3:
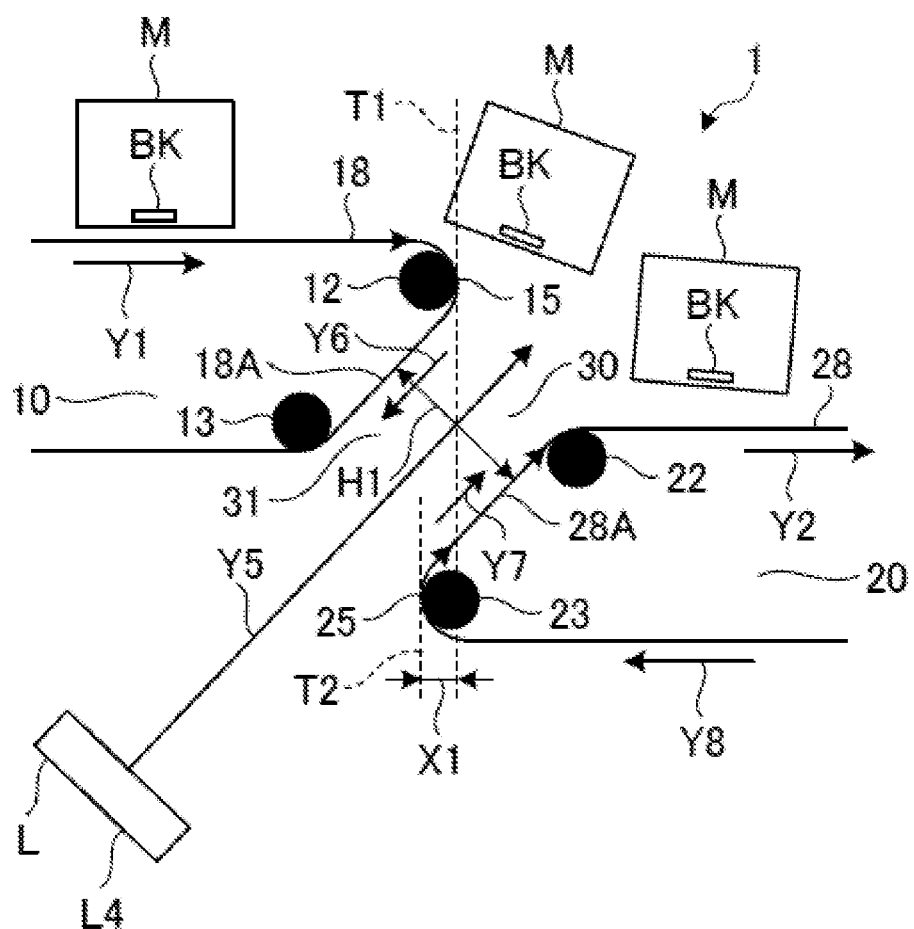
FIG. 3 and FIG. 4 are diagrams illustrating a first conveyor belt and a second conveyor belt.

Hereinafter, a structure of the first belt conveyor 10 and the second belt conveyor 20 near the proximity region 30 will be described. The proximity region 30 refers to a region/area in which the first belt conveyor 10 and the second belt conveyor 20 are close to each other, but still in a non-contacting state. FIG. 3 is a diagram illustrating the first conveyor belt 18 and the second conveyor belt 28 in the proximity region 30. As shown in FIG. 3, the first conveyor belt 18 in the proximity region 30 spans between the roller 12 and the roller 13. The roller 12 is positioned above the roller 13. Further, the roller 12 is positioned on the downstream side of the roller 13 in the conveyance direction of the article M. That is, the roller 12 protrudes toward the downstream side in the conveyance direction of the article M with respect to the roller 13. Thus, the first belt conveyor 10 has a conveyance terminal end part 15 in a position that is in contact with the roller 12 on the first conveyor belt 18. The conveyance terminal end part 15 is located on the most downstream side in the conveyance direction of the article M in the first belt conveyor 10.

Further, the roller 13 is positioned below the roller and on the downstream side of the roller 12 in the conveyance direction of the article M (in FIG. 3, the roller 13 is positioned below and on the left side of the roller 12). That is, the first conveyor belt 18 moves in the Y1 direction, and is bent diagonally downward in an acute angle by the roller 12. Then, the first conveyor belt 18 moves in the Y6 direction to the roller 13. A surface between the roller 12 and the roller 13 in the first conveyor belt 18 is a first curved surface 18A. The conveyance terminal end part 15 is located on the most downstream side of the first conveyor belt 18 in the conveyance direction of the article M.

Further, the second conveyor belt 28 in the proximity region 30 spans between the roller 22 and the roller 23. The roller 23 is positioned on the lower side in the vertical direction with respect to the roller 22. Further, the roller 23 is positioned on the downstream side of the roller 22 in the conveyance direction of the article M. Therefore, the second belt conveyor 20 has a conveyance terminal start part 25 in a position which is in contact with the roller 23 on the second conveyor belt 28. The conveyance terminal start part 25 is located on the most downstream side in the conveyance direction of the article M in the second belt conveyor 20.

Further, the roller 23 is positioned below the roller and on the downstream side of the roller 22 in the conveyance direction of the article M (in FIG. 3, the roller 23 is positioned below and on the left side of the roller 22). That is, the second conveyor belt 28 moves in the Y8 direction, and is bent diagonally upward in an acute angle by the roller 23. Then, the second conveyor belt 28 moves in the Y7 direction to the roller 22. A surface between the roller 23 and the roller 22 in the second conveyor belt 28 is a second curved surface 28A. The conveyance terminal start part 25 is located on the most downstream side of the second conveyor belt 28 in the conveyance direction of the article M.

In the first embodiment, the first curved surface 18A and the second curved surface 28A are spaced apart from each other by a distance H1, and are positioned so as to face substantially parallel each other. Between the first curved surface 18A and the second curved surface 28A, a gap 31 is formed by them. The gap 31 is a space that diagonally passes from the lower left to upper right in FIG. 3. That is, the gap 31 is a space that diagonally passes from the upper right to the lower left in FIG. 3. The distance H1 of the gap is desirably a distance at which the article M does not fall downward, but even when the distance H1 of gap is larger than the distance where the article M does not fall downward, the second conveyor belt 28 at the second curved surface 28A moves in the direction of the arrow Y7, and therefore it is difficult for the article M to fall downward.

The code reader L4 is located below the first conveyor belt 18 and the second conveyor belt 28 in the up-down direction, and located immediately below the first conveyor belt 18. When the code reader L4 is an optical scanner, the code reader L4 emits light from the lower side toward the gap 31 substantially parallel to the first curved surface 18A and the second curved surface 28A (That is, diagonally upward from the lower left side of the gap 31 to the upper right side of the gap 31). The light emitted from the article M is reflected by the symbol attached to the lower surface M4 of the article M when the article M passes through the proximity region 30 (or gap 31), and the code reader L4 receives the light. In this way, the code reader L4 reads the symbol attached to the lower surface M4 of the article M. When the code reader L4 is a camera, the code reader L4 is located to face toward the proximity region 30, and when the article M passes through the proximity region 30, the code reader L4 captures and reads the symbol attached to the lower surface M4 of the article M.

In the first embodiment, a position (T1), which corresponds to the conveyance terminal end part 15 on the first conveyor belt 18, is separated from a position (T2), which corresponds to the conveyance terminal start part 25 of the second conveyor belt 28, by the distance X1 (X1=0 or more) in the conveyance direction of the article M. That is, when viewed from above in FIG. 3, the conveyance terminal end part 15 overlaps with the conveyance terminal start part 25 in the conveyance direction or is located on the upstream side (the right side in FIG. 3) of the conveyance terminal start part 25 in the conveyance direction.

In this state, the conveyance terminal end part 15 of the first conveyor belt 18 is located immediately above the second conveyor belt 28. In other words, the conveyance terminal end part 15 of the first conveyor belt 18 is located on the front side of the second conveyor belt 28 when viewed from above in the vertical direction, and the conveyance terminal end part 15 is not in contact with the second conveyor belt 28 (apart from the above). Specifically, the conveyance terminal end part 15 is located immediately above the second curved surface 28A. In the first embodiment, when viewed from above in FIG. 3, the conveyance terminal end part 15 is located above the second curved surface 28A, and is spaced apart from the second curved surface 28A in the vertical direction.

Further, the conveyance terminal start part 25 is located immediately below the first conveyor belt 18. In other words, the conveyance terminal start part 25 is located on the rear side of the first conveyor belt 18 when viewed from above in the vertical direction, and the conveyance terminal start part 25 is not in contact with the first conveyor belt 18. Specifically, the conveyance terminal start part 25 is located immediately below the first curved surface 18A. In the first embodiment, when viewed from above in the vertical direction, the conveyance terminal start part 25 is positioned below the first curved surface 18A, and is spaced apart from the first curved surface 18A in the vertical direction.

In the first embodiment described above, a worker places the article M on the conveyance surface of the first conveyor belt 18. The placed article M is transported in the Y1 direction by the first conveyor belt 18. The article M that has reached the conveyance terminal end part 15 separates from the first conveyor belt 18 in the proximity region 30 and falls onto the conveyance surface of the second conveyor belt 28. When the article M falls from the first conveyor belt 18 to the second conveyor belt 28 in the proximity region 30, the code reader L4 reads the symbol attached to the lower surface M4. The article M fallen in the conveyance surface of the second conveyor belt 28 is conveyed in the Y2 direction by the second conveyor belt 28.

The belt conveyor 1 of the first embodiment includes the first conveyor belt 18 for conveying the articles M, the second conveyor belt 28 which is not in contact with the first conveyor belt 18 and conveys the articles M passed from the first conveyor belt 18, and the code reader L4 which is located below the first conveyor belt 18 and reads the symbol of the article M passing from the first conveyor belt 18 to the second conveyor belt 28. The first conveyor belt 18 is positioned above the second conveyor belt 28. In the belt conveyor having such a configuration, the first conveyor belt 18 is positioned above the second conveyor belt 28. Therefore, it is possible to prevent the article M from being stuck in a gap between the first conveyor belt 18 and the second conveyor belt 28 and preventing conveyance of the article M.

Second Embodiment

Figure 4:
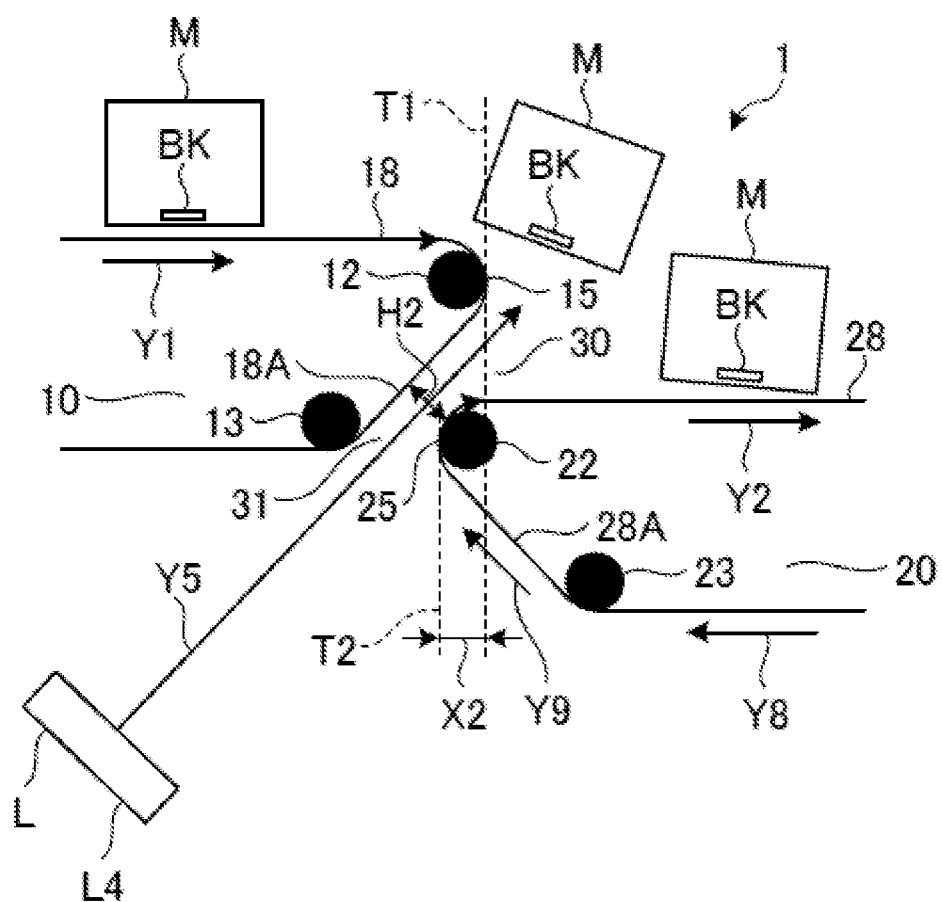

Hereinafter, a second embodiment will be described. FIG. 4 is a diagram illustrating the first conveyor belt 18 and the second conveyor belt 28 in the proximity region 30 according to the second embodiment. The second embodiment differs from the first embodiment in the configuration of the second conveyor belt 28 as shown in FIG. 4. That is, the second conveyor belt 28 in the proximity region 30 spans between the roller 22 and the roller 23. The roller is positioned above the roller 23 in the vertical direction. Further, the roller 23 is positioned on the upstream side of the roller 22 in the conveyance direction of the article M. Therefore, the second belt conveyor 20 has a conveyance terminal start part 25 in a position in contact with the roller 22.

Further, the roller 22 is located above the roller 23 and on the downstream side of the roller 23 in the conveyance direction of the article M (in FIG. 4, the roller 22 is located above and on the left side of the roller 23). That is, the second conveyor belt 28 moves in the Y8 direction, and is bent diagonally upward by the roller 23. Thereafter, the second conveyor belt 28 moves in the Y9 direction to the roller 22. A surface between the roller 23 and the roller 22 in the second conveyor belt 28 is a second curved surface 28A. The second conveyor belt 28 conveyed to the roller 22 is bent in an acute shape by the roller 22.

In the second embodiment, the first curved surface 18A is opposite to the second conveyor belt 28 at a distance H2. The gap 31 is formed between first curved surface 18A and second conveyor belt 28. The gap 31 is a space that passes from lower left to upper right in FIG. 4. That is, the gap 31 is a space that passes from the upper right to the lower left in FIG. 4. The distance H2 of the gap is desirably a distance at which the article M does not fall downward, but even when the distance H2 of gap is larger than the distance at which the article M does not fall downward, the conveyance surface of the second conveyor belt 28 moves in the Y2 direction, and therefore it is difficult for the article M to fall downward.

The code reader L4 is located below the first conveyor belt 18 and second conveyor belt 28 in the vertical direction and immediately below the first conveyor belt 18. The code reader L4 reads a symbol attached to the lower surface M4 of the article M diagonally upward from lower left side to upper right side of the gap 31.

In the second embodiment, the position (T1), which corresponds to the conveyance terminal end part 15 of the first conveyor belt 18, is separated from the position (T2), which corresponds to the conveyance terminal start part 25 of the second conveyor belt 28, by the distance X2 (X2=0 or more). That is, the conveyance terminal end part 15 overlaps with the conveyance terminal start part 25 in the conveyance direction or is located on the downstream side (the right side in FIG. 4) of the conveyance terminal start part 25 in the conveyance direction. In such a state, the conveyance terminal end part 15 of the first conveyor belt 18 is located immediately above the second conveyor belt 28. That is, when viewed from above, the conveyance terminal end part 15 of the first conveyor belt 18 is located on the front side of the second conveyor belt 28, and the conveyance terminal end part 28 is spaced apart from the second conveyor belt 28.

In the second embodiment described above, a worker places the article M on the conveyance surface of the first conveyor belt 18. The placed article M is transported in the Y1 direction by the first conveyor belt 18. The article M that has reached the conveyance terminal end part 15 separates from the first conveyor belt 18 in proximity region 30 and falls to the conveyance surface of the second conveyor belt 28. When the article M falls from the first conveyor belt 18 to the second conveyor belt 28 in the proximity region 30, the code reader L4 reads the symbol attached to the lower surface M4. The article M dropped in the conveyance surface of the second conveyor belt 28 is conveyed in the Y2 direction by the second conveyor belt 28.

The belt conveyor 1 of the second embodiment includes the first conveyor belt 18 for conveying the articles M, the second conveyor belt 28 which is not in contact with the first conveyor belt 18 and conveys the articles M passed from first conveyor belt 18, and the code reader L4 which is located below the first conveyor belt 18 and reads the symbol of the article M passed from the first conveyor belt 18 to the second conveyor belt 28. The first conveyor belt 18 is positioned above the second conveyor belt 28. In the belt conveyor having such a configuration, the first conveyor belt 18 is positioned above the second conveyor belt 28. Therefore, it is possible to prevent the article M from being stuck in a gap between the first conveyor belt and the second conveyor belt 28 and preventing conveyance of the article M.

In the embodiments described above, the belt conveyor 1 is used for conveying articles M in a warehouse. However, the belt conveyor 1 may be, for example, a belt conveyor for conveying a product to be sold in a store.

In the embodiments described above, the conveyance direction of the article M by the first conveyor belt 18 and the second conveyor belt 28 is the same direction. However, the conveyance direction of the article M by the first conveyor belt 18 and the conveyance direction of the article by the second conveyor belt 28 may be different from each other.

Also, in the embodiments described above, a belt conveyor has been described as an example of a conveyor. However, the conveyor may be another type of article moving mechanism (e.g., roller-based conveyors) besides a belt conveyor.

In the embodiments described above, the code reader L4 is located below the first conveyor belt 18 and the second conveyor belt 28. However, the code reader L4 may instead be located below the first conveyor belt 18, and need not necessarily be located below the second conveyor belt 28 in all examples.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed:

1. A conveyor, comprising:
    a first belt conveyor having a first surface along which an article is conveyed in a conveyance direction from an upstream end to a downstream end, the first surface having, in the conveyance direction, an upstream end and a downstream end;
    a second belt conveyor directly downstream of the first belt conveyor in the conveyance direction and having a second surface along which the article is conveyed in the conveyance direction from an upstream end to a downstream end, the downstream end of the first surface being at a height greater than the upstream end of the second surface; and
    a first reading unit positioned below the first belt conveyor to read a symbol on the article through a gap between the first and second belt conveyors, wherein
    the first belt conveyor includes a first upper roller and a first lower roller, the first upper roller located at the downstream end of the first surface, the first lower roller being offset from the first upper roller along a direction opposite to the conveyance direction,
    the second belt conveyor includes a second upper roller and a second lower roller, the second upper roller located at the upstream end of the second surface, the second lower roller being offset from the second upper roller along the conveyance direction, and
    the first upper roller is directly above the second upper roller.

2. The conveyor according to claim 1, wherein the first surface is inclined from the upstream end to the downstream end.

3. The conveyor according to claim 2, wherein the upstream end of the second surface is directly below the downstream end of the first surface.

4. The conveyor according to claim 2, wherein the second surface is inclined from the upstream end to the downstream end.

5. The conveyor according to claim 4, wherein the angle of incline of the first surface is equal to the angle of incline of the second surface.

6. The conveyor according to claim 1, further comprising:
    a second reading unit positioned above a conveyance path of the article.

7. The conveyor according to claim 6, further comprising:
    a third reading unit positioned on a lateral side of the conveyance path.

8. The conveyor according to claim 7, further comprising:
    a fourth reading unit arranged opposite to the third reading unit on another lateral side of the conveyance path.

9. The conveyor according to claim 1, wherein the first reading unit is a camera.

10. The conveyor according to claim 1, wherein the symbol is a barcode or a two-dimensional code.

11. An article conveyor system, comprising:
    a first belt conveyor for conveying an article along a conveyance direction;
    a second belt conveyor for conveying the article and arranged on a downstream side in the conveyance direction of the first belt conveyor; and
    a first reading unit positioned below the first belt conveyor to read a symbol on the article through a gap between the first and second belt conveyors, wherein
    a first surface of the first belt conveyor is higher than a second surface of the second belt conveyor, and
    a downstream end of the first surface is adjacent an upstream end of the second surface with the gap therebetween, wherein
    the first belt conveyor includes a first upper roller and a first lower roller, the first upper roller located at the downstream end of the first surface, the first lower roller being offset from the first upper roller along a direction opposite to the conveyance direction,
    the second belt conveyor includes a second upper roller and a second lower roller, the second upper roller located at the upstream end of the second surface, the second lower roller being offset from the second upper roller along the conveyance direction, and the first upper roller is directly above the second upper roller.

12. The article conveyor system according to claim 11, wherein the first belt conveyor has an inclined surface that is inclined with respect to the first surface.

13. The article conveyor system according to claim 12, wherein the upstream end of the second surface is directly below the inclined surface.

* * * * *